Patented Nov. 14, 1922.

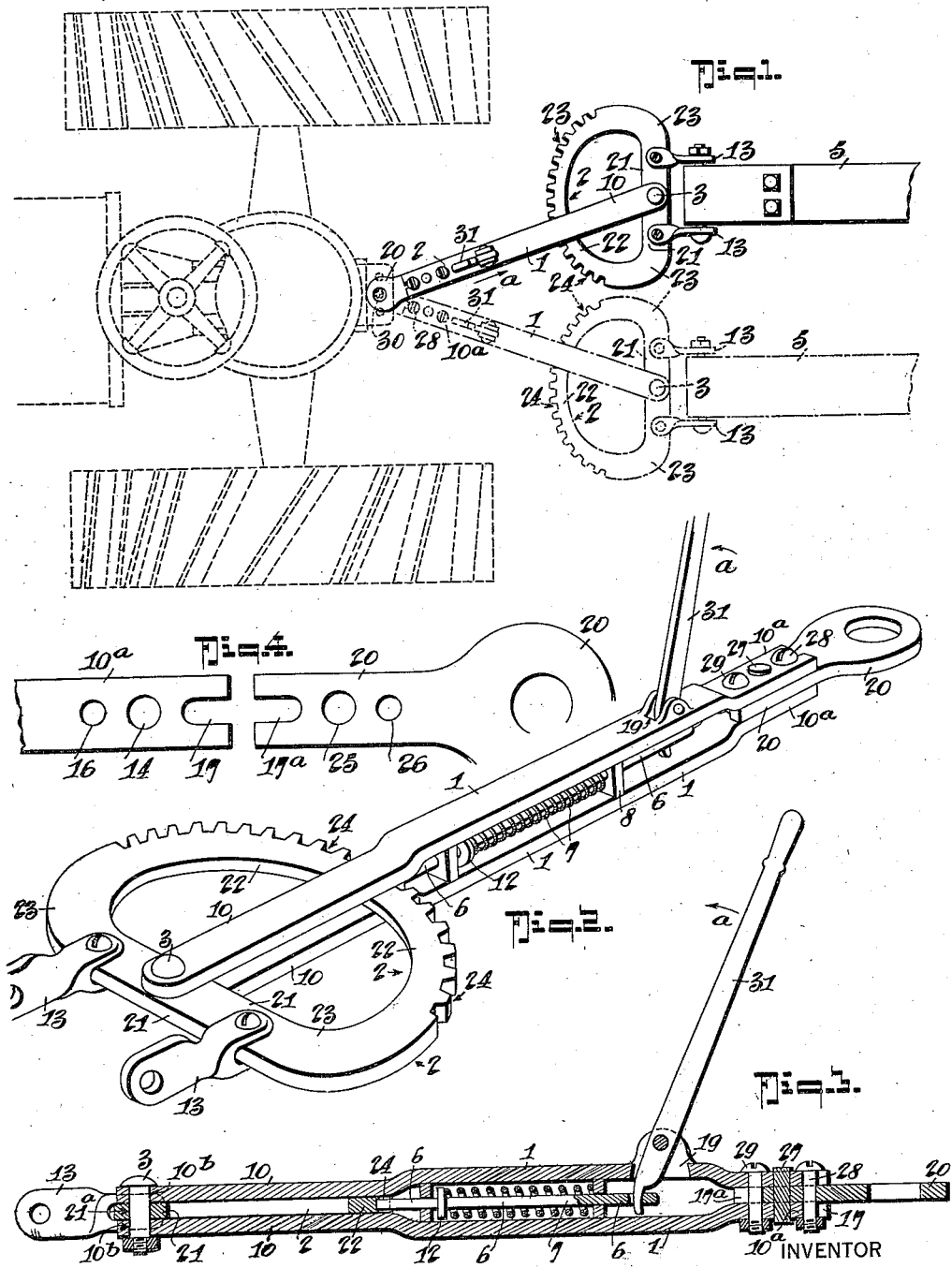

1,435,373

UNITED STATES PATENT OFFICE.

FLOYD M. BLAIN, OF CENTRAL POINT, OREGON.

TRACTOR HITCH.

Application filed December 23, 1921. Serial No. 524,497.

*To all whom it may concern:*

Be it known that I, FLOYD M. BLAIN, a citizen of the United States, residing at Central Point, in the county of Jackson and State of Oregon, have invented a new and Improved Tractor Hitch, of which the following is a specification.

This invention has reference to improvements in draft rigging for tractors and the like and it is more particularly designed to provide a draw bar attachment or hitch for connecting trailers onto the rear end of a well-known type of tractor and whose co-operating parts are so arranged and combined whereby the draw bar or hitch may be conveniently and quickly adjusted by the tractor driver from the tractor seat for positioning the trailer, for tracking in a direct line with the tractor, or to cause it to follow the tractor in offset relation therewith, as conditions may make desirable.

Another object of my invention is to provide a draft rigging of the general character stated, in which is included a main draft bar adapted for being coupled onto the usual draft lug on the tractor body, and a supplemental draft member with which the trailer or trailers are connected and which is pivotally mounted upon the main draft bar or member to oscillate in lateral direction to provide for positioning the trailer or trailers at an offset with respect to the tractor, and means conveniently operable by the tractor driver adapted for cooperating with the said supplemental draft member for locking such supplemental member to either of its laterally adjusted positions relatively to the main draft bar and to the tractor.

Again my invention comprehends, in a draft rigging of the character stated, a main draft bar composed of two members whose outer ends are separated for receiving a supplemental draft member pivotally connected to the rear end of the main draft bar and adapted for lateral adjustment relatively to such bar, a lever release detent device located between the two members of the draft bar that automatically moves into interlocked engagement with the supplemental draft member for holding it to its set positions, and a peculiar arrangement of break pin connection on the pull end of the main draft bar that includes means for holding the two members that constitute the main draft bar and the detent devices mounted thereon as a rigid unitary draft member.

With the above objects in view, my present invention comprehends an improved construction of tractor hitch that embodies the novel features of construction and combination of parts fully set forth in the following detailed description, specifically stated in the appended claims and illustrated in the accompanying drawings, in which:

Figure 1 is a plan view of my improved tractor hitch so much of a tractor and a trailer being indicated to illustrate the practical application of my invention, the hitch and the trailer being indicated in full lines at one of the offset positions and in dot and dash lines at another and oppositely disposed offset position.

Figure 2 is a perspective view of my improved construction of tractor hitch, the supplemental draft member being in the midway position and adapted for pulling the trailer in direct longitudinal alignment with the hitch or draft bar.

Figure 3 is a longitudinal section of my improved tractor hitch, the parts being arranged as in Figure 2.

Figure 4 is a detail plan view of the pull end of one of the members that constitute the main draft bar and the clevis member that joins the draft bar to the tractor draft stud, the parts being separated to indicate the arrangement of the break pin apertures and the slotways in the two members.

In the practical development of my present invention the hitch or draft bar that couples with the tractor, and to which the plow or other trailing implement or machine is connected, consists of a link or draft member composed of two bars 1—1 of like width and length, whose opposite ends are bent inwardly toward each other to bring them sufficiently close together to snugly receive a supplemental draft member 2 (presently further described) between the outer ends 10 of the bars 1—1, and to receive a clevis or pull member between the inner ends 10ª of the said members 1—1, as is clearly shown in Figures 2 and 3 of the drawings; by reference to which it will be noticed that the clevis or pull member includes a ring shaped head 20 adapted for hooking onto the usual draft stud 30 on the rear end of the tractor, as shown.

The supplemental draft member 2 mentioned includes a flat cross portion 21 that is provided with a pivot aperture 21$^a$ located midway its ends 23. The ends 23 of the member 20 merge with a substantially semi-circular shaped member 22 whose outer edge is formed into a segmental rack 24. The member 2 is held flatwise between the outer ends 10—10 of the bars 1—1 which constitutes the draft or hitch connection and the said member 2 is pivoted on a stud pin 3 that takes through apertures 10$^b$—10$^b$ in the bar ends 10—10 and through the aperture 21$^a$ in the cross portion 21 of the supplemental draft member, as best shown in Figure 3.

By referring to Figures 2 and 3, it will be readily apparent that the supplemental draft member 2 is mounted between the bars 1—1 to oscillate in the horizontal plane, laterally with respect to the main draft or hitch bar, so that the line of draft on the plow or trailer beam 5 be positioned at an offset, that is,—to either side of a line of draft in direct longitudinal alignment with the draft stud 2 on the rear end of the tractor.

6 designates a detent or lock pawl which is in the nature of a rod whose outer end is shaped for snugly fitting within the ratchet teeth on the adjustable supplemental draft member 2.

The detent rod 6 is normally forced to its rack engaging position by a stout coil spring 7 that is mounted around the rod 6 with its inner end seating against a vertical bearing 8 secured between the bars 1—1 and its other end against a washer 12 that is attached to the rod, as is best shown in Figure 3.

13 designates clevis members which are attached to the adjustable draft member 2 and are adapted for connection with the draft beam 5 of the plow or other trailing implements, as is clearly shown in Figure 1.

The inner ends 10$^a$ of the bar members 1 are each provided with a break pin receiving aperture 14 and an aperture 16 located inwardly of the aperture 14 and a bifurcation 17.

The clevis device, that fits between the ends 10$^a$—10$^a$ of the bar members 1—1, has a central break pin receiving aperture 25 and an aperture 26, it also having a bifurcation 17$^a$, as shown.

The several apertures and bifurcations in the two ends 10$^a$ and in the clevis device are so spaced (see Figure 4) that when the clevis device is fit between the ends 10$^a$—10$^a$ the several apertures register and the bifurcations of the ends 10$^a$—10$^a$ also register, the bifurcated end of the clevis being then in alignment with the two apertures 14—16 in the ends 10$^a$—10$^a$.

By forming the ends 10$^a$—10$^a$ and the clevis with the apertures and bifurcations, as shown and stated, the said apertures and bifurcations can be made by punching or otherwise, at one operation.

Furthermore, the aforesaid arrangement of apertures and bifurcations in the ends 10$^a$—10$^a$ of the bar members 1—1 and the clevis device provides a simple and effective way for joining the main draft bar and the clevis by a wooden break pin 27 that fits the vertically aligned central apertures in the ends 10$^a$—10$^a$ and the clevis end, as is best shown in Figure 3, by reference to which it will be noticed that the arrangement of the several parts stated is such that a cheap but effective provision is made for holding the clevis device in rigid connection with the draft bar and at the same time permit the ready separation of the hitch or draft bar when the break pin 27 breaks, since the bifurcated ends 10$^a$ pull away from a clamp screw 28 that fits down through the bifurcations in the ends 10$^a$—10$^a$ and engages the aperture 14 in the clevis, the screw passing out from its engaging bifurcations with the clevis device as its bifurcated ends pull away from a clamp screw 29 that fits through the aperture 16 in the upper end portion 10$^a$ and through the bifurcation in the clevis, and the aperture 16 in the lower end portion 10$^a$, the screw 29 pulling out from the clevis when the clevis device and the draft bar separate.

31 designates a hand lever which projects upwardly from the main draft or hitch bar to a point for being conveniently grasped by the operator on the tractor seat. The lever 31 is pivoted on the upper end of the draw bar and has its lower end projected through a slot 19 in such bar and connected with the front end of the detent rod 6, the connection being such that when the lever is swung in the direction indicated by the arrows $a$ on the drawings, the main and the supplemental draft members 1 and 2 are released from their rigid connection and are left free to flex laterally with respect to each other until the reach bar and the trailer assume a desired position relatively to the tractor when, by releasing the lever 31 the detent rod 6 will interlock with the rack face of the member 2 and thereby restore the several parts, to assume, as it were, a rigid hitch bar unit, that is,—a rigid connection between the tractor and the trailer capable of swinging laterally from the trailer lug and free to follow and pull the trailer along as the trailer travels forward with the tractor free to accommodate itself to the vibrations of tractor travel.

The construction of my tractor hitch is such that it may be readily made by a skilled blacksmith and without the need of special machinery and tools in the making thereof.

In my construction of tractor hitch, the clevis connection at the front end is such that provision is made for the ready separation of the hitch bar from the tractor under excessive retarding strains present when pulling the plow or other like implement forward with the tractor. Thus, should a plow or a gang of plows be trailing and any one or more of the plows become stalled by reason of engaging rocks or roots, the parting of the break pin would permit instant separation of the hitch bar from the trailer.

From the foregoing description taken in connection with the accompanying drawing, the complete construction, the manner of its use and the advantages of my invention will be readily apparent to those familiar with tractor hitches of the type shown and described.

What I claim is:

1. In a draft rigging of the class described, a main draft bar comprising two parallel plates, a clevis secured between said plates at one end and spacing the same apart, a supplemental ring-like member pivoted between the other ends of said plates and lying projected between them, said supplemental member having a rack edge, spacing lugs between said plates, said spacing lugs being located at one side of the rack edge, a spring pressed pawl reciprocably mounted in said spacing lugs to engage said rack, one of said plates having a slot and a pair of ears, a lever projected through said slot and fulcrumed in said ears, said lever and said pawl having finger and slot engagement whereby said pawl may be withdrawn by movement of said lever, said supplemental member having means for connecting with the draft beam of a plow or other tracking machine, all being arranged substantially as shown and for the purposes described.

2. In a clevis connection for tractor hitches of the character described, the combination with the forward end of the hitch bar, said end comprising separated top and bottom members having two sets of aligning apertures and a set of bifurcated ends; of a clevis device having an apertured head for pivotally connecting with the hitching stud of a tractor, and having two sets of apertures and a bifurcated end to align with the apertures and bifurcated ends of the upper and lower members of the hitch bar, a break pin passing through an aligning set of apertures in the hitch bar and clevis device for locking the hitch bar and clevis together, and bolts cooperative with the other apertures and bifurcations of the top and bottom members of the hitch bar and the clevis device for holding said clevis device against lateral movement and in rigid relation to the draft bar.

3. In draft rigging, a main draft bar comprising two flat members spaced apart, a clevis held between the two flat bar members at one end, a ring-like supplemental member lying between said bar members at the other end, a pivot passing through said other end of said bar members and through said supplemental member, said supplemental member including a rack edge lying between the opposite ends of said main draft bar, a spring pressed latch located between said bar members and engaging said rack, a lever mounted on one of the flat bar members of said main draft bar and projecting through an aperture in said flat bar member and engaging said latch, and means to connect said supplemental member to the beam of a tracking element.

FLOYD M. BLAIN.